March 10, 1931.  P. H. DUNN  1,796,009
CROSSHEAD
Filed Oct. 12, 1929
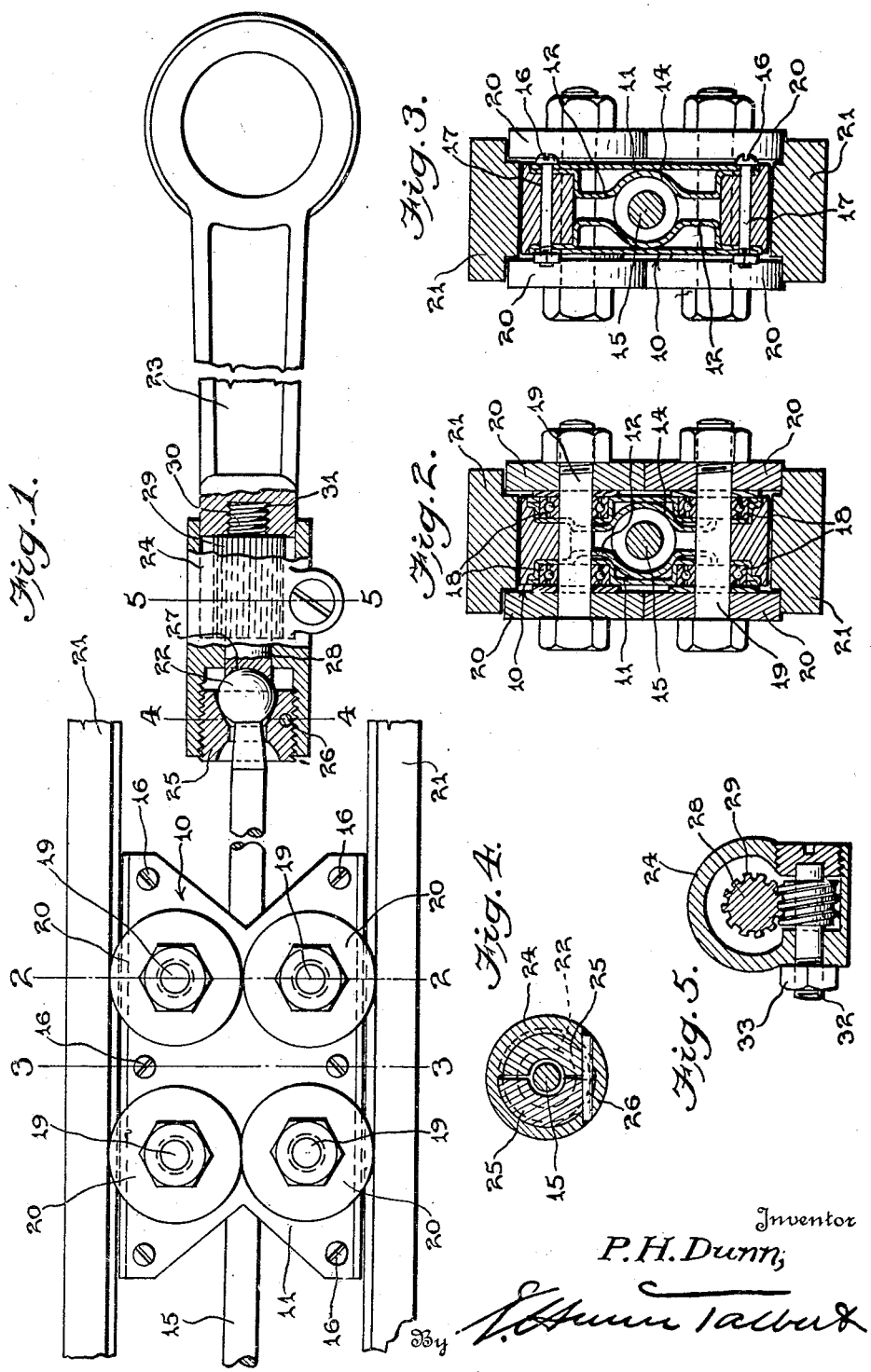
Inventor
P. H. Dunn Patented Mar. 10, 1931

1,796,009

UNITED STATES PATENT OFFICE

PATRICK H. DUNN, OF MILES CITY, MONTANA

CROSSHEAD

Application filed October 12, 1929. Serial No. 399,307.

The object of the invention is to improve the construction of crossheads for engines of the locomotive or stationary type by forming the crosshead in such a way that the piston rod may be secured to it by clamping, thus doing away with the conventional wrist pin connection; to provide a crosshead of which the body portion is of skeleton form, so as to be comparatively light and therefore susceptible of cheap construction; to provide a device of this character in which movement over the crosshead guides is had by means of roller bearings; to provide a construction of this general character in which the connection between the crosshead and the connecting link is had by means of a special connection between the link and the extended portion of the piston rod; and to provide means for the quick take-up of any wear between the connecting link and the connected portion of the piston rod.

With this object in view the invention consists in a construction and combination of parts of which a preferred embodiment is illustrated in the accompanying drawings, wherein:

Figure 1 is a side elevational view of the invention, partly broken away, and indicating the essential associated parts of an engine.

Figures 2, 3, 4, and 5 are sectional views on the planes indicated by the lines 2—2, 3—3, 4—4, and 5—5 respectively of Figure 1.

Seeking to do away with the conventional piston key and wrist pin connections between the piston rod and connecting links with the crosshead, the crosshead 10 in the present invention is made of skeleton form having the outer side walls 11 and parallel web portions 12, the latter of which are arched at their longitudinal centers, as indicated at 14, so that the piston rod 15 instead of having terminated at the crosshead is extended through the latter between the arched portions. Connection between the crosshead and the piston rod is effected by clamping action of the arched portions on the web, bolts 16 spanning the crosshead above and below the arched portions and passing through spacers 17 disposed between the outer walls and the webs and serving to communicate clamping action on the web when the bolts are tightened.

Seated in the outer walls of the crosshead are conventional roller bearings 18 which support transverse shafts 19, the latter protruding laterally beyond the outer walls of the crosshead and receiving rollers 20 which bear upon the crosshead slides 21. By this construction, free and easy movement of the crosshead over the slides is possible, the rollers 20 traversing the slides and the shafts 19 rotating freely in the bearings 18.

The extended end of the piston rod is terminated in a ball 22 which may be formed as an integral part of the piston rod, or as an attached part mechanically secured. The ball constitutes an element of a unifrom connection between the piston rod and the connecting link 23 which will take care of any lack of lateral alignment between the connecting link and the piston rod, the former being provided with a sleeve 24 mounted to permit relative axial movement between it and the sleeve but to preclude relative angular or turning movement. The forward end of the sleeve 24 is interiorly threaded for the reception on an exteriorly threaded split cone bearing 25 which surrounds the ball 22. The cone bearing 25, when properly seated, is locked in position by a tangentially arranged key in the form of a pin 26 passing through holes in the sleeve and a seat in the cone bearing. The ball has a thrust bearing in a conical seat 27 in the end of a take-up member 28 which is rotatably mounted in the sleeve 24 and formed with gear teeth on the body portion 29, a rearwardly extended externally threaded tail extension 30 being carried by the take-up member and entering a threaded socket at the forward end of the connecting link. Disposed in a tangential bearing in the sleeve 24 is a worm having an interiorly exposed tool seat 32 at one end and carrying a lock nut 33. The worm meshes with the teeth of the take-up member 28 and, when the lock nut 33 is released may be rotated by a tool applied to the seat 32. The take-up member, under such conditions will be rotated and relative movement between it and the connecting rod effected to take up any lost motion existing, since the take-up member is rotatably mounted in the sleeve but precluded from axial movement with respect to the latter. The position of the sleeve with respect to the connected end of the piston rod being fixed by the seating of the cone bearing 25, the operation of the take-up 28 will serve to take up any lost motion between the connecting link and the rod resulting from wear or otherwise.

The invention having been described what is claimed as new and useful is:

1. An engine crosshead of skeleton construction and having spaced parallel outer walls and an intervening web paralleling said outer walls and arched at the center for disposition in surrounding relation to a piston rod, and clamping bolts extending transversely through the crosshead for effect-binding engagement of the arched portions of the web on said rod.

2. An engine crosshead of skeleton construction and having spaced parallel side walls and web plates disposed between said walls and paralleling the same, said web plates being transversely arched along a longitudinal center line, clamping bolts extending through the crosshead above and below the arched portions of the web plates, and spacers through which said bolts extend, the spacers being disposed between the side walls and the web plates.

In testimony whereof he affixes his signature.

PATRICK H. DUNN.